Aug. 5, 1952     W. J. BORCHARDT     2,605,994
SEAL ASSEMBLY
Filed Oct. 31, 1945
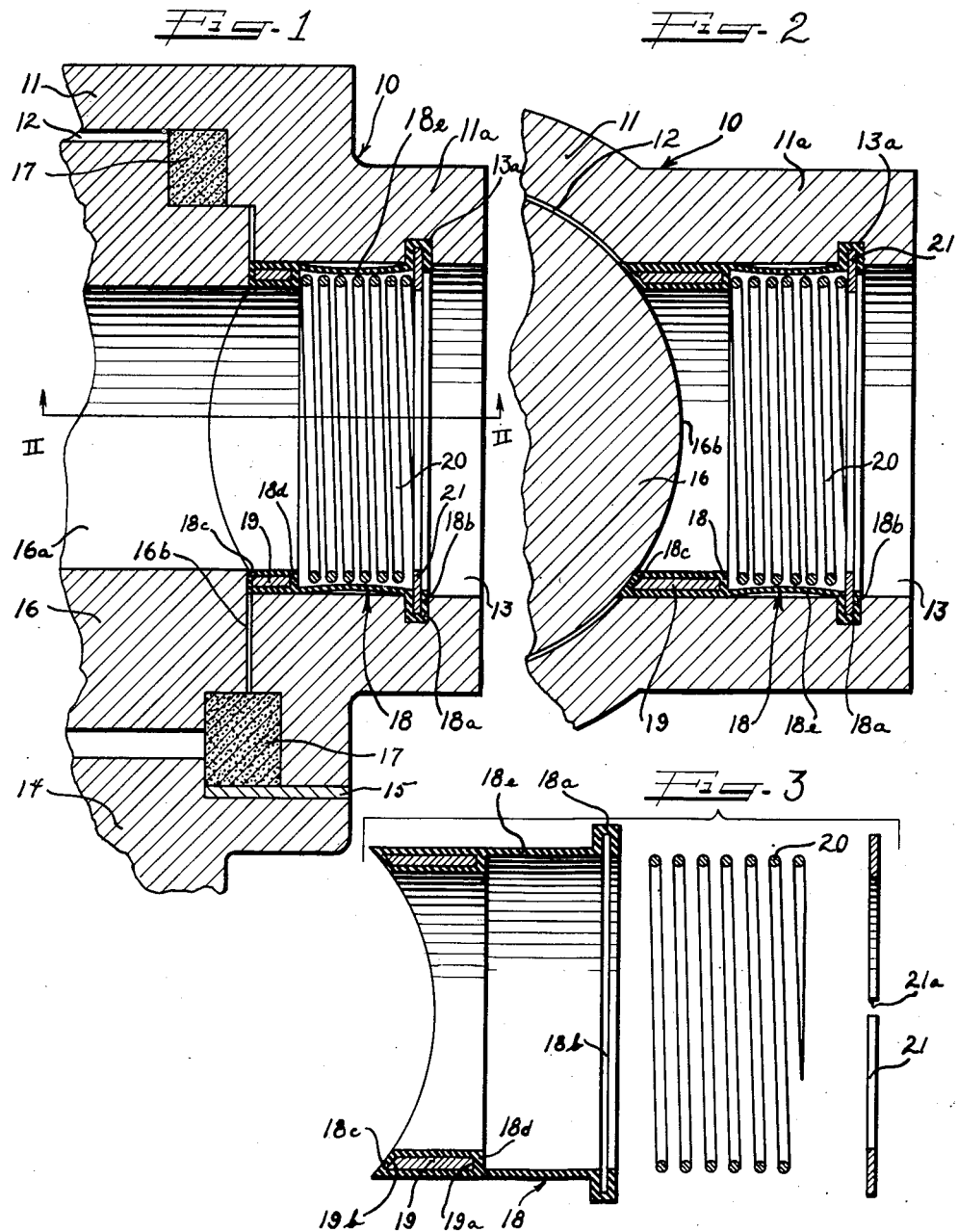
Inventor
WILLIAM JOSEPH BORCHARDT Patented Aug. 5, 1952

2,605,994

UNITED STATES PATENT OFFICE 2,605,994

SEAL ASSEMBLY

William Joseph Borchardt, Los Angeles, Calif., assignor to Thompson Products, Inc., Cleveland, Ohio, a corporation of Ohio Application October 31, 1945, Serial No. 625,831

1 Claim. (Cl. 251—113)

This invention relates to port seals and the like which are easily inserted into position and readily accommodate expansion and contraction without lessening sealing efficiency.

Specifically the invention deals with seals for plug valves and the like such as rotary selector valves.

According to this invention there is provided a tubular member for insertion in the port of a valve or the like and having an end face for sealingly engaging a movable valve member such as a plug adapted to control flow through the port. The tubular member has an internally grooved outturned flange at one end thereof adapted to be readily seated in an internal groove surrounding the port. The groove in the flange receives a snap ring which sealingly anchors the flange in the groove of the port. The other end of the tubular member is thickened to provide a relatively wide end rim or sealing face for sealingly engaging the valve member or plug. This end face is contoured to fit around the valve member. The thickened portion preferably is rigid and a metal insert ring can be imbedded therein. The inner end of the thickened portion provides an internal shoulder spaced axially from the flange portion of the tubular member. A flexible tubular portion integrally connects the flanged end and the thickened end of the tubular member. A spring is held under compression between the snap ring and the shoulder in the tubular member and functions to urge the sealing end face of the member against the valve or plug. The flexible intermediate portion of the tubular member between the flange and the thickened portion is normally bowed inwardly from the port wall to accommodate movement of the sealing end face away from the anchored flange portion of the tubular member and thereby readily allow expansion of the assembly to accommodate wear or shrinkage of the sealing end face of the tubular member. In the event of expansion of the sealing end face of the tubular member the flexible tubular portion will assume a more inwardly bowed position. In this manner, the seal assembly of this invention has an anchored end portion and an axially movable opposite end portion.

It is, then, an object of the invention to provide an inexpensive, easily assembled, and efficient seal construction for ports and the like.

A still further object of the invention is to provide a seal assembly having an anchored end portion and an axially movable end portion.

A still further object of the invention is to provide a seal assembly for plug valves and the like composed of a tubular member having a sealing end face, an internal shoulder intermediate the ends of the tube, an outturned flange at the end of the tube remote from the sealing end face, a rigid ring for locking the flange to a port, and a coil spring interposed between the rigid ring and the internal shoulder.

A still further object of the invention is to provide a seal assembly for plug valves and the like having a first end portion anchored against axial movement, a second end portion adapted to move axially relative to the first end portion, and a spring interposed between the first and second end portions for urging the second end portion away from the first end portion.

A still further object of the invention is to provide a port seal for valves and the like embodying a tubular member adapted to be readily inserted in a port for presenting a sealing end face to a valve or the like and having an outturned internally grooved flange spaced from the sealing end face and arranged to be sealingly anchored to the port.

A still further object of the invention is to provide a port seal for an internally grooved port wherein the seal is equipped with an outturned internally grooved flange for seating in the groove of the port and for receiving a rigid locking rim to hold the flange in sealing engagement in the groove of the port.

Other and further objects of the invention will be apparent to those skilled in the art from the following detailed description of the annexed sheet of drawings which, by way of preferred example only, illustrates one embodiment of the invention.

On the drawings:

Figure 1 is a fragmentary vertical cross-sectional view of a selector valve or shut-off cock embodying a seal assembly according to this invention.

Figure 2 is a fragmentary horizontal cross-sectional view, taken along the line II—II of Figure 1, but illustrating the plug of the valve in port-closing position.

Figure 3 is an exploded vertical cross-sectional view of the seal of this invention, illustrating the seal parts in spaced axial alignment for assembly.

As shown on the drawings:

In Figures 1 and 2 the reference numeral 10 designates generally a valve having a body member 11 providing an operating chamber 12 and equipped with a laterally extending nipple portion 11a defining a cylindrical port 13 communicating with the valve-operating chamber 12 at its inner end. A cover 14 is provided on the body member 11 and is sealed thereon by means of a gasket 15. A cylindrical plug valve 16 is rotatably mounted in the valve-operating chamber 12 on graphitic carbon bearing rings 17. The valve 16 has a cylindrical bore 16a therethrough adapted to register with the port 13. In addition, the valve 16 has a cylindrical peripheral wall 16b held in spaced relation from the operating chamber 12 by the bearing rings 17 and adapted to span the port 13 whenever the valve is rotated to move the bore 16a therethrough out of registration with the port. It should be understood, of course, that the valve has an operating post (not shown) extending through the cover 14 so that the valve can be rotated in the chamber 12.

The port 13 has an internal groove 13a therearound spaced axially outwardly from the chamber 12 of the body 11. This groove 13a is preferably provided with a flat cylindrical bottom wall and straight spaced parallel side walls.

In accordance with this invention a rubber tubular member 18 is seated in the port 13. The tubular member 18 has an outturned flange 18a at one end thereof for snugly fitting in the groove 13a of the port. This flange 18a preferably has a flat cylindrical outer rim and spaced opposed straight parallel side walls so that the rim will fit on the flat bottom of the groove and so that the side walls will hug the side walls of the groove. The flange 18a has an internal groove 18b therearound preferably midway between the side walls of the flange and terminating inwardly from the rim of the flange to leave walls of substantial thickness surrounding the groove.

The opposite end of the tube 18 is thickened and defines a dished or concave sealing end face 18c for fitting around a portion of the wall 16b of the valve 16. The thickened portion of the tube extends inwardly of the tube to terminate in an internal shoulder 18d intermediate the ends of the tube. A rigid ring 19 of metal or rigid plastic material is imbedded in the thickened portion of the tube but is completely covered with rubber. This imbedded ring 19 has a flat end wall 19a spaced inward from the shoulder 18d and backing up the shoulder to render it somewhat rigid. The opposite end of the ring has a dished or concave end face 19b spaced inwardly from the end face 18c of the tube to back up this end face and render it somewhat rigid. It should be understood, however, that the shoulder 18d and the end face 18c are resiliently deformable to a limited extent but the end faces of the ring 19 prevent unlimited deformation of the rubber end face 18c and shoulder 18d. The arrangement is preferably such that an even covering of rubber is provided for both end faces 19a and 19b of the ring and for this purpose the end faces of the ring have the same configuration as the end face 18c and shoulder 18d of the tube.

The tube 18 has a relatively limp and flexible intermediate integral portion 18e joining the flange 18a and the thickened portion at the other end of the tube.

The outer diameter of the main body of the tube 18 is slightly smaller than the diameter of the port 13 so that the tube will slidably fit in the port.

A tubular coil spring 20 is inserted in the tube 18 and is bottomed therein on the shoulder 18d. The diameter of the coil spring 20 is less than the inside diameter of the portion 18e of the tube but greater than the inside diameter of the thickened portion of the tube.

A flat metal or plastic snap ring 21, sized to fit in the groove 18b of the flange 18a, is provided for locking the flange in the groove 13a of the port and for providing an abutment for the opposite end of the coil spring 20. The snap ring 21 has a gap 21a therein and can be contracted so as to be readily inserted in the groove 18b of the flange 18a. When the ring is released it will expand to secure the flange 18a in the groove 13a of the port. The inside diameter of the ring 21 is less than the inside diameter of the tubular portion 18e to provide an abutment for the spring 20.

The seal assembly is readily inserted in the port 13 by dropping the tube into the port and by seating the flange 18a in the groove 13a of the port. The coil spring 20 is then dropped into the tube in the port to be bottomed on the shoulder 18d and the snap ring is then inserted in the groove 18b of the flange 18a to compress the spring 20 and to sealingly lock the flange 18a in the groove 13a of the port. The tube 18 is preferably longer than the distance between the wall 16b of the valve 16 and the groove 13a of the port 13 so that the flexible tubular portion 18e will be slightly bowed inwardly as shown in Figures 1 and 2 when the assembly is in position. This inward bow of the tubular portion 18e accommodates elongation of the assembly to maintain the end face 18c in sealing engagement with the wall 16b of the valve with a pressure determined by the spring 20. In this arrangement, wear or shrinkage of the end face 18c of the tube 18, or tolerance variations in the assembly will not interfere with the maintenance of sealing engagement between the end face of the tube and the peripheral wall 16b of the valve. Since, in addition, the portion 18e of the tube is relatively limp, it can be bowed further inwardly to accommodate expansion of the sealing end face 18c or opposite tolerance variations in the assembly.

From the above descriptions it will be understood that the invention provides an assembly having an axially moving sealing end face and an axially locked opposite end flange with a spring or other resilient means constantly urging the sealing end face away from the locked end to maintain a desired sealing pressure between the sealing end face and the part to be sealed. It will also be understood that the seals of this invention are readily inserted into ports or the like of a valve without removing the valve from its housing. Replacement of seals in valves or the like is thereby facilitated.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a fluid flow control device comprising a rotary plug valve including a body having a valve port, the improvement of a self-adjusting sealing device for the valve port comprising a flexible generally tubularly conformed sleeve having an outturned, gasket-forming flange on one end adapted to overlie a portion of the valve body adjacent the valve port, said flange having a cylindrical outer rim and spaced opposed straight parallel side walls, the opposite end of said sleeve having an inwardly extending thickened portion providing an internal annular shoulder intermediate the ends of the sleeve, a first rigid ring embedded in said thickened portion to back up said internal shoulder, the end face of said thickened portion being curved to conformingly engage the plug of the valve, a second rigid ring in said flange between said side walls, said second ring having an inside diameter less than the inside diameter of said sleeve, and a coil spring in said sleeve bottomed against said second ring and against said internal shoulder to resiliently load the end face of the sleeve.

WILLIAM JOSEPH BORCHARDT.

REFERENCES CITED

The following references are of record in the file of this patent:

UNITED STATES PATENTS

| Number | Name | Date |
|---|---|---|
| 2,294,105 | Wallgren | Aug. 25, 1942 |
| 2,383,983 | Melichar | Sept. 4, 1945 |
| 2,392,198 | Snyder | Jan. 1, 1945 |
| 2,404,816 | Snyder | July 30, 1946 |
| 2,522,231 | Loftis | Sept. 12, 1950 |

FOREIGN PATENTS

| Number | Country | Date |
|---|---|---|
| 499,150 | Great Britain | Jan. 10, 1939 |